(12) United States Patent
Fujita et al.

(10) Patent No.: US 10,663,592 B2
(45) Date of Patent: May 26, 2020

(54) FLIGHT CONTROL DEVICE, FLIGHT CONTROL METHOD, AND COMPUTER-READABLE RECORDING MEDIUM

(71) Applicant: NEC Solution Innovators, Ltd., Koto-ku, Tokyo (JP)

(72) Inventors: Mitsuhiro Fujita, Tokyo (JP); Hisashi Noda, Tokyo (JP); Hideshi Yamashita, Tokyo (JP); Yasuyuki Ihara, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 0 days.

(21) Appl. No.: 15/774,663

(22) PCT Filed: Aug. 9, 2016

(86) PCT No.: PCT/JP2016/073475
§ 371 (c)(1),
(2) Date: May 9, 2018

(87) PCT Pub. No.: WO2017/081898
PCT Pub. Date: May 18, 2017

(65) Prior Publication Data
US 2018/0330623 A1 Nov. 15, 2018

(30) Foreign Application Priority Data
Nov. 9, 2015 (JP) ................................. 2015-219781

(51) Int. Cl.
*G08G 5/00* (2006.01)
*G01S 17/89* (2020.01)
(Continued)

(52) U.S. Cl.
CPC .............. *G01S 17/89* (2013.01); *G01S 17/42* (2013.01); *G01S 17/933* (2013.01);
(Continued)

(58) Field of Classification Search
None
See application file for complete search history.

(56) References Cited

U.S. PATENT DOCUMENTS

2011/0272523 A1 11/2011 Uegaki
2015/0234055 A1* 8/2015 Ashjaee ................. G01C 11/02
701/2

(Continued)

FOREIGN PATENT DOCUMENTS

JP H05-024591 A 2/1993
JP H06-344994 A 12/1994
(Continued)

OTHER PUBLICATIONS

Colomina et al., "Unmanned aerial systems for photogrammetry and remote sensing: A review", ISPRS Journal of Photogrammetry and Remote Sensing 92 (2014), p. 79-97 (Year: 2014).*
(Continued)

*Primary Examiner* — Tamara L Weber

(57) ABSTRACT

A flight control device 10 is device for controlling an unmanned aircraft 20, including: a region detection unit 11 that detects a flight-restricted region 30 in which flight is restricted; a distance calculation unit 12 that calculates a distance d from the flight-restricted region 30 to the unmanned aircraft 20; and a collision determination unit 13 that specifies an altitude and a speed of the unmanned aircraft 20, and determines whether the unmanned aircraft 20 lands in the flight-restricted region 30 in case of a crash, based on the altitude and the speed that have been specified and the calculated distance d.

18 Claims, 11 Drawing Sheets

(51) Int. Cl.
*G05D 1/10* (2006.01)
*G08G 5/04* (2006.01)
*G01S 17/933* (2020.01)
*G01S 17/42* (2006.01)
*G05D 1/06* (2006.01)
*G01S 19/52* (2010.01)

(52) U.S. Cl.
CPC ........... *G05D 1/0688* (2019.05); *G05D 1/106* (2019.05); *G08G 5/00* (2013.01); *G08G 5/006* (2013.01); *G08G 5/0013* (2013.01); *G08G 5/0069* (2013.01); *G08G 5/045* (2013.01); *B64C 2201/141* (2013.01); *G01S 19/52* (2013.01)

(56) References Cited

U.S. PATENT DOCUMENTS

| | | | | |
|---|---|---|---|---|
| 2015/0254988 | A1* | 9/2015 | Wang | G05D 1/0214 701/3 |
| 2016/0070265 | A1* | 3/2016 | Liu | B64C 39/024 701/3 |
| 2017/0045884 | A1* | 2/2017 | Kablaoui | G05D 1/0022 |
| 2017/0057634 | A1* | 3/2017 | Hunt | B64C 39/024 |
| 2017/0106976 | A1* | 4/2017 | Kuhara | B64C 39/024 |
| 2017/0225680 | A1* | 8/2017 | Huang | B60R 21/0134 |

FOREIGN PATENT DOCUMENTS

| | | |
|---|---|---|
| JP | 2005-309717 A | 11/2005 |
| JP | 2007-141108 A | 6/2007 |
| JP | 2014-199548 A | 10/2014 |
| WO | 2010/082352 A1 | 7/2010 |
| WO | 2015/157883 A1 | 10/2015 |

OTHER PUBLICATIONS

"Unmanned aerial vehicle (Mujin-koukuuki)", Wikipedia (from the Internet), May 25, 2015 (retrieved; Jun. 1, 2015), URL: http://ja.wikipedia.org/wiki/%E7%84%A1%E4%BA%BA%E8%88%M%E7%A9%BA%E6%A9%9F.

"Drone", Weblio Dictionary (from the Internet), Apr. 22, 2015 (retrieved; Jun. 1, 2015), URL:http://www.weblio.jp/content/%E3%83%89%E3%83%AD%E3%83%BC%E3%83%83.

International Search Report for PCT Application No. PCT/JP2016/073475, dated Oct. 18, 2016.

Japanese Office Action for JP Application No. 2017-549999 dated Sep. 10, 2019 with English Translation.

\* cited by examiner

ND RECORDING
FLIGHT CONTROL DEVICE, FLIGHT CONTROL METHOD, AND COMPUTER-READABLE RECORDING MEDIUM

This application is a National Stage Entry of PCT/JP2016/073475 filed on Aug. 9, 2016, which claims priority from Japanese Patent Application 2015-219781 filed on Nov. 9, 2015, the contents of all of which are incorporated herein by reference, in their entirety.

TECHNICAL FIELD

The present invention relates to a flight control device and a flight control method for controlling the flight of an unmanned aircraft, and a computer-readable recording medium having recorded thereon a program for implementing the same.

BACKGROUND ART

Conventionally, unmanned aircrafts (hereinafter also referred to as "UAVs (unmanned aerial vehicles)") called "drones" have been used for various applications such as military applications and crop-dusting. In particular, with the recent reduction in size and increase in output of batteries, small-sized unmanned aircrafts using an electric motor as the power source have been developed (e.g., see Non-Patent Documents 1 and 2). The small-sized unmanned aircrafts are simple to operate, and thus are quickly becoming widespread.

In addition, an unmanned aircraft includes a GPS (Global Positioning System) receiver, and can specify its own position. Accordingly, autopilot by which flight is carried out along a set path has been implemented for the unmanned aircraft, leading to a further increase in the applications of the unmanned aircraft.

LIST OF PRIOR ART DOCUMENTS

Non-Patent Documents

Non-Patent Document 1: "Unmanned aerial vehicle", [online] May 25, 2015, Wikipedia, [retrieved on Jun. 1, 2015], the Internet <URL: http://ja.wikipedia.org/wiki/%E7%84%A1%E4%BA%BA%E8%88%AA%E7%A9%BA%E6%A9%9F>

Non-Patent Document 2: "Drone", [online], Apr. 22, 2015, webliodictionary, [retrieved on Jun. 1, 2015], the Internet <URL: http://www.weblio.jp/content/%E3%83%89%E3%83%AD%E3%83%BC%E3%83%B3>

DISCLOSURE OF THE INVENTION

Problems to be Solved by the Invention

Meanwhile, in order for an unmanned aircraft to specify its own position, the unmanned aircraft needs to receive GPS signals from three or four satellites by using the GPS receiver. However, depending on the environment, it may not be possible to receive all the necessary GPS signals. In such a case, the unmanned aircraft cannot specify its own position, and thus may crash. In addition, the unmanned aircraft may also crash owing to the influence of wind, a voltage drop in the battery, or the like.

However, it is extremely difficult to completely eliminate the possibility of a crash for the conventional unmanned aircrafts. Therefore, if a person, an object, or the like is present at the crashing point, a serious collision accident may occur.

An exemplary object of the present invention is to provide a flight control device, a flight control method, and a computer-readable recording medium that can solve the above-described problems, and suppress the occurrence of a collision accident due to a crash of an unmanned aircraft.

Means for Solving the Problems

In order to solve the above-described object, a flight control device according to an aspect of the present invention is a flight control device for controlling an unmanned aircraft, including:

a region detection unit that detects a flight-restricted region in which flight is restricted;

a distance calculation unit that calculates a distance from the flight-restricted region to the unmanned aircraft; and a collision determination unit that specifies an altitude and a speed of the unmanned aircraft, and determines whether the unmanned aircraft lands in the flight-restricted region in case of a crash, based on the altitude and the speed that have been specified and the calculated distance.

In order to solve the above-described object, a flight control method according to an aspect of the present invention is a flight control method for controlling an unmanned aircraft, including the steps of:

(a) detecting a flight-restricted region in which flight is restricted;

(b) calculating a distance from the flight-restricted region to the unmanned aircraft; and (c) specifying an altitude and a speed of the unmanned aircraft, and determining whether the unmanned aircraft lands in the flight-restricted region in case of a crash, based on the altitude and the speed that have been specified and the calculated distance.

Furthermore, in order to solve the above-described object, a computer-readable recording medium according to an aspect of the present invention is a computer-readable recording medium having recorded thereon a program for controlling an unmanned aircraft by using a computer, the program including instructions to cause the computer to execute the steps of:

(a) detecting a flight-restricted region in which flight is restricted;

(b) calculating a distance from the flight-restricted region to the unmanned aircraft; and (c) specifying an altitude and a speed of the unmanned aircraft, and determining whether the unmanned aircraft lands in the flight-restricted region in case of a crash, based on the altitude and the speed that have been specified and the calculated distance.

Advantageous Effects of the Invention

As described above, according to the present invention, it is possible to suppress the occurrence of a collision accident due to a crash of an unmanned aircraft.

MODES FOR CARRYING OUT THE INVENTION

First Embodiment

Hereinafter, a flight control device, a flight control method, and a program according to an embodiment of the present invention will be described with reference to FIGS. 1 to 6.

Device Configuration

Figure 1:
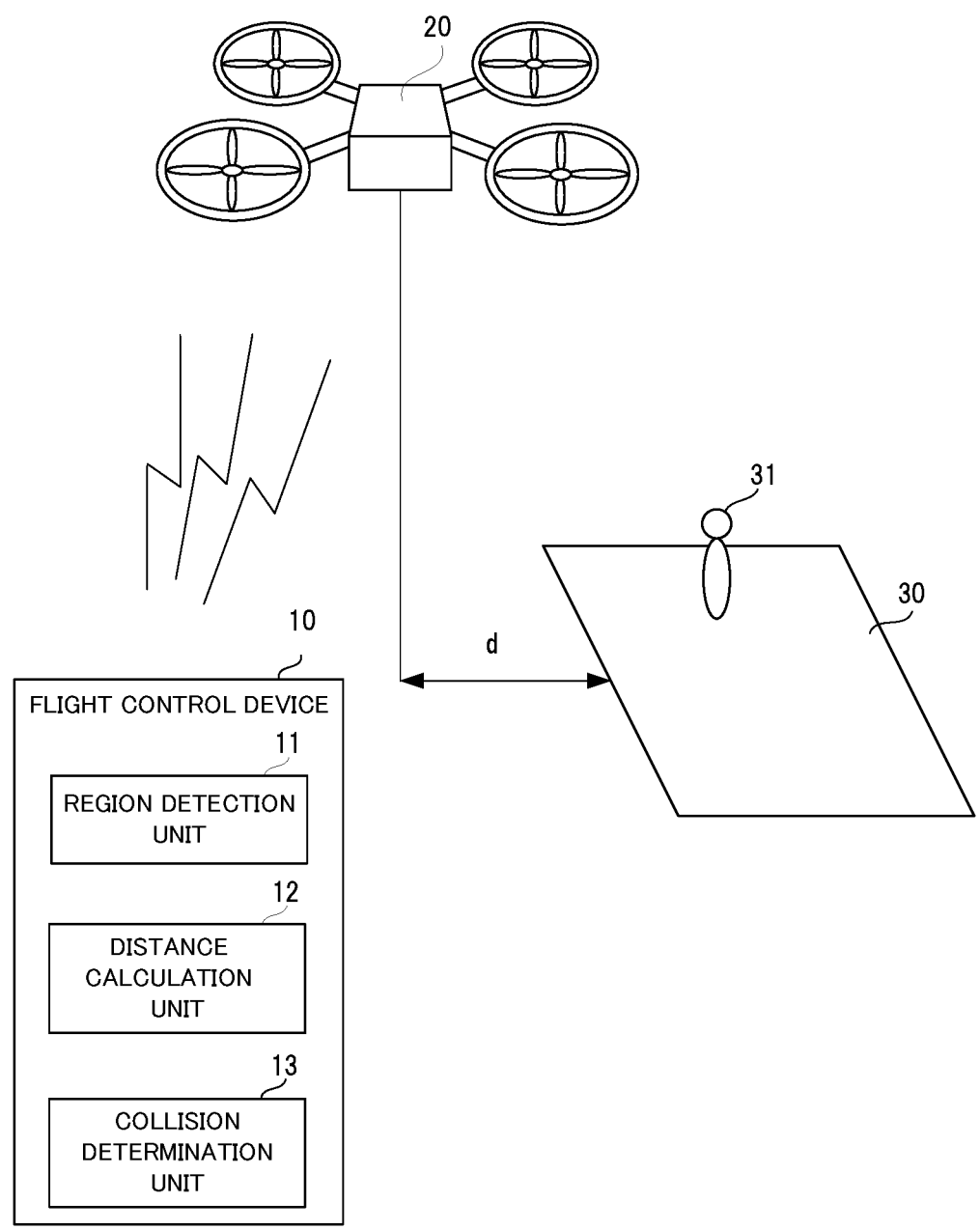
FIG. 1 is a configuration diagram showing the schematic configuration of a flight control device according to a first embodiment of the present invention.

First, the configuration of a flight control device according to a first embodiment of the present invention will be described. FIG. 1 is a configuration diagram showing the schematic configuration of a flight control device according to the first embodiment of the present invention.

As shown in FIG. 1, a flight control device 10 according to the first embodiment is a device for controlling an unmanned aircraft 20. The flight control device 10 includes a region detection unit 11, a distance calculation unit 12, and a collision determination unit 13.

The region detection unit 11 detects a flight-restricted region 30 in which flight is restricted. The distance calculation unit 12 calculates a distance d from the flight-restricted region to the unmanned aircraft 20. First, the collision determination unit 13 specifies the altitude and the speed of the unmanned aircraft 13. Next, the collision determination unit 13 determines whether the unmanned aircraft 20 lands in the flight-restricted region 30 in case of a crash, based on the altitude and the speed that have been specified and the calculated distance d.

Thus, in the first embodiment, whether the unmanned aircraft 20 lands in the flight-restricted region 30 in case of a crash is constantly determined. Accordingly, the occurrence of a collision accident due to a crash of the unmanned aircraft 20 can be suppressed when a region in which a person 31 or the like is present is set as the flight-restricted region 30.

Figure 2:
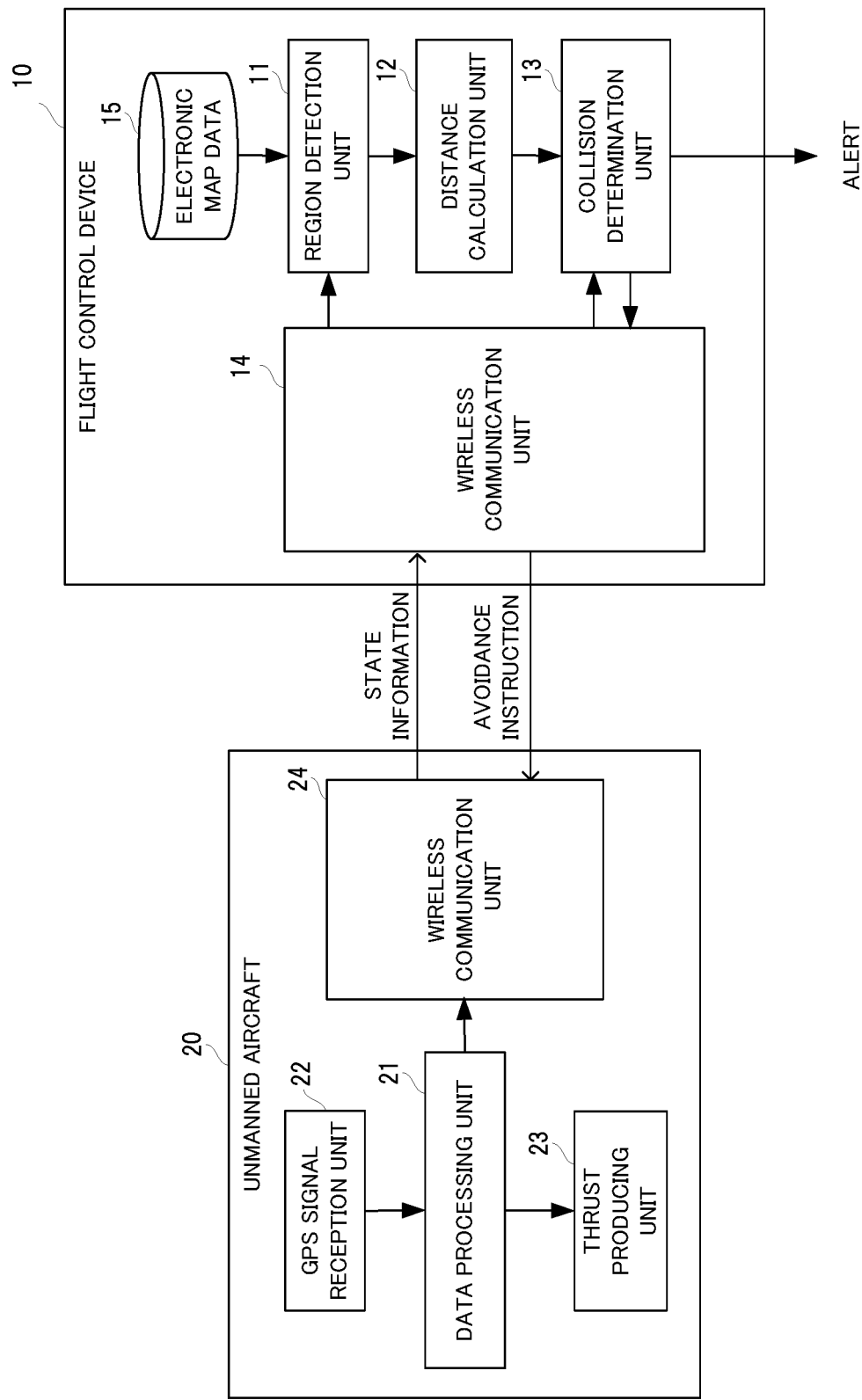
FIG. 2 is a block diagram specifically showing the configuration of the flight control device according to the first embodiment of the present invention.

Next, the configuration of the flight control device 10 according to the first embodiment will be described in further detail with reference to FIGS. 2 to 4 in addition to FIG. 1. FIG. 2 is a block diagram specifically showing the configuration of the flight control device according to the first embodiment of the present invention. FIG. 2 also discloses the configuration of an unmanned aircraft that is to be controlled.

First, as shown in FIG. 1, in the first embodiment, the unmanned aircraft 20 that is to be controlled is a multicopter including a plurality of rotors, or a so-called drone. As shown in FIG. 2, the unmanned aircraft 20 includes a data processing unit 21, a GPS signal reception unit 22, a thrust producing unit 23, and a wireless communication unit 24.

In the unmanned aircraft 20, the wireless communication unit 24 performs wireless data communication with the flight control device 10. The wireless communication unit 24 can be implemented, for example, by a communication device for Wi-Fi communication.

The GPS signal reception unit 22 receives a GPS (Global Positioning System) signal from a satellite, and measures the current position and altitude h, based on the received GPS signal. In the example shown in FIG. 1, four thrust producing units 23 are provided, and each of the thrust producing units 23 includes a rotor that produces thrust and an electric motor serving as the driving source of the rotor.

The data processing unit 21 calculates a speed v of the unmanned aircraft 20, based on the current position and altitude h measured by the GPS signal reception unit 22. In addition, the data processing unit 21 transmits, as the state information, the calculated speed v, the current position (the latitude and the longitude) and altitude h to the flight control device 10 via the wireless communication unit 24. Further, the data processing unit 21 controls the speed v, the altitude h, and the advancing direction of the unmanned aircraft 20 by adjusting the thrust of each of the thrust producing units 23. Note that a sensor for detecting the speed v may be mounted to the unmanned aircraft 20. In this case, the speed v is measured by the sensor.

With this configuration, the unmanned aircraft 20 can fly along a set route while checking the current location, for example. In addition, the unmanned aircraft 20 can also fly in accordance with an instruction from the flight control device 10.

As shown in FIG. 2, in the first embodiment, the flight control device 10 is installed outside the unmanned aircraft 20, and performs data communication with the unmanned aircraft 20 via wireless communication. Accordingly, the flight control device 10 includes a wireless communication unit 14, in addition to the region detection unit 11, the distance calculation unit 12, and the collision determination unit 13 described above.

The wireless communication unit 14 performs wireless data communication with the unmanned aircraft 20 in accordance with instructions from the region detection unit 11 and the collision determination unit 13. The wireless communication unit 14 is also implemented by a communication device for Wi-Fi communication, for example.

In the first embodiment, the region detection unit 11 detects the flight-restricted region 30 from electronic map data 15 that has been created in advance. Specifically, when the state information from the unmanned aircraft 20 is received by the wireless communication unit 14, the region detection unit 11 first specifies the position of the unmanned aircraft 20 from the received state information. Subsequently, the region detection unit 11 checks the specified position of the unmanned aircraft against the electronic map data, and detects a region that is set as the flight-restricted region 30, from a set range (e.g., a range within a radius of 100 m) centered on the specified position.

In the first embodiment, the distance calculation unit 12 calculates the distance d from the flight-restricted region 30 to the unmanned aircraft 20, based on the position of the unmanned aircraft 20 that has been specified based on the GPS signal, and the detected position of the flight-restricted region 30. Specifically, when the flight-restricted region 30 is detected by the region detection unit 11, the distance calculation unit 12 specifies the position of the boundary of the flight-restricted region 30, and compares the specified position of the boundary with the position of the unmanned aircraft 20. Further, the distance calculation unit 12 specifies the point on the boundary that is located closest to the unmanned aircraft 20, and calculates the distance in the horizontal direction (horizontal distance) from the specified point to a given point (e.g., center point) on the unmanned aircraft 20. This distance is used as the distance d.

In the first embodiment, when the state information from the unmanned aircraft 20 is received by the wireless communication unit 14, the collision determination unit 13 specifies the altitude h and the speed v of the unmanned aircraft 20 from the received state information. In addition, the collision determination unit 13 specifies a region (hereinafter referred to as "landing region") on the ground where the unmanned aircraft 20 may land if the unmanned aircraft 20 crashes, based on the altitude h and the speed v that have been specified.

Then, the collision determination unit 13 uses the distance d calculated by the distance calculation unit 12 so as to determine whether the landing region is located in the flight-restricted region 30. If the result of the determination indicates that the landing region is located in the flight-restricted region 30, the collision determination unit 13 determines that the unmanned aircraft 20 lands in the flight-restricted region 30 in case of a crash.

Here, a specific example of collision determination processing will be described with reference to FIGS. 3 and 4. FIG. 3(a) is a diagram illustrating collision determination processing executed when the unmanned aircraft is hovering, and FIG. 3(b) is a diagram showing the landing region when the unmanned aircraft is hovering. FIG. 4(a) is a diagram illustrating collision determination processing when the unmanned aircraft is moving in the air, and FIG. 4(b) is a diagram showing the landing region when the unmanned aircraft is moving.

Figure 3:
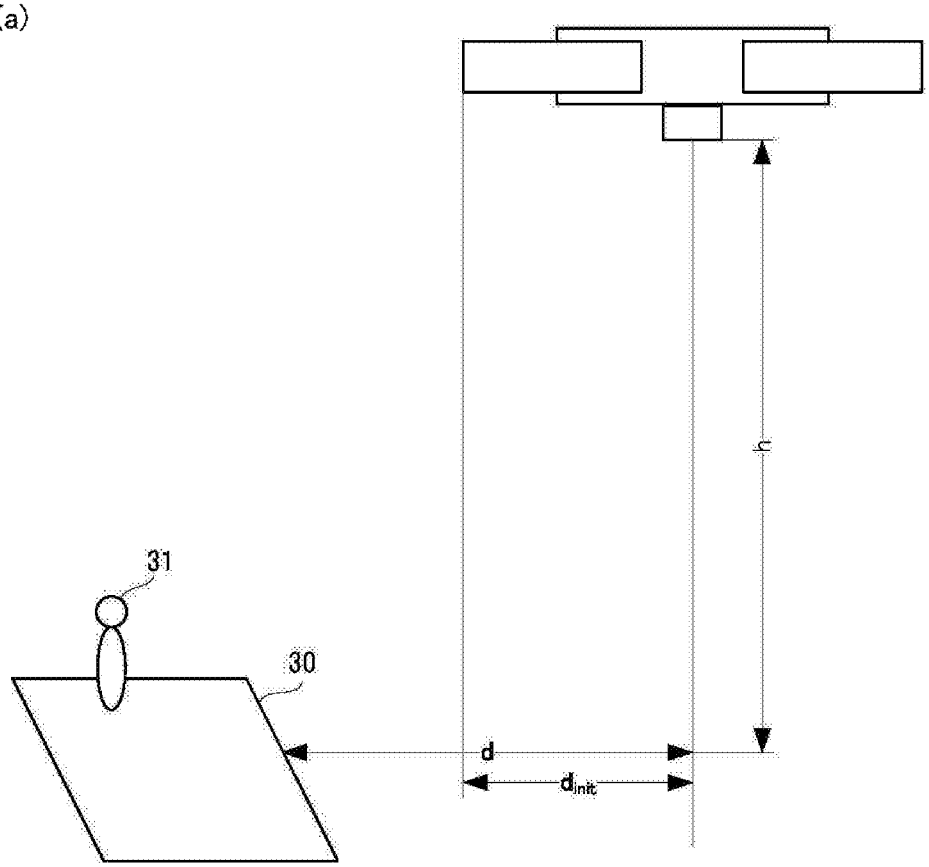
FIG. 3(a) is a diagram illustrating collision determination processing when an unmanned aircraft is hovering.
FIG. 3(b) is a diagram showing a landing region when an unmanned aircraft is hovering.
Figure 3:
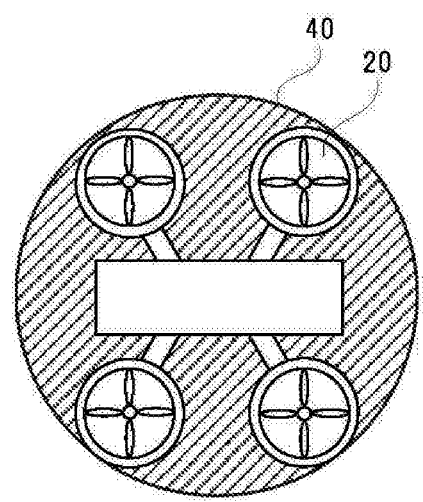
Figure 4:
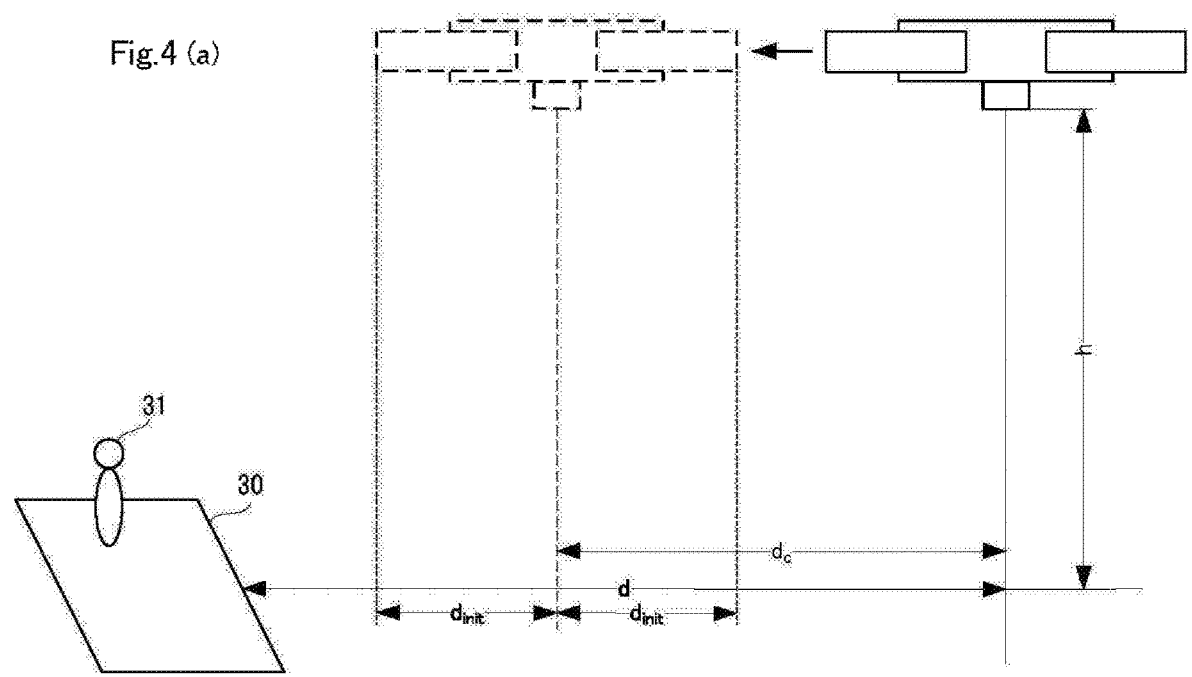
FIG. 4(a) is a diagram illustrating collision determination processing when an unmanned aircraft is moving in the air.
FIG. 4(b) is a diagram showing a landing region when an unmanned aircraft is moving.
Figure 4:
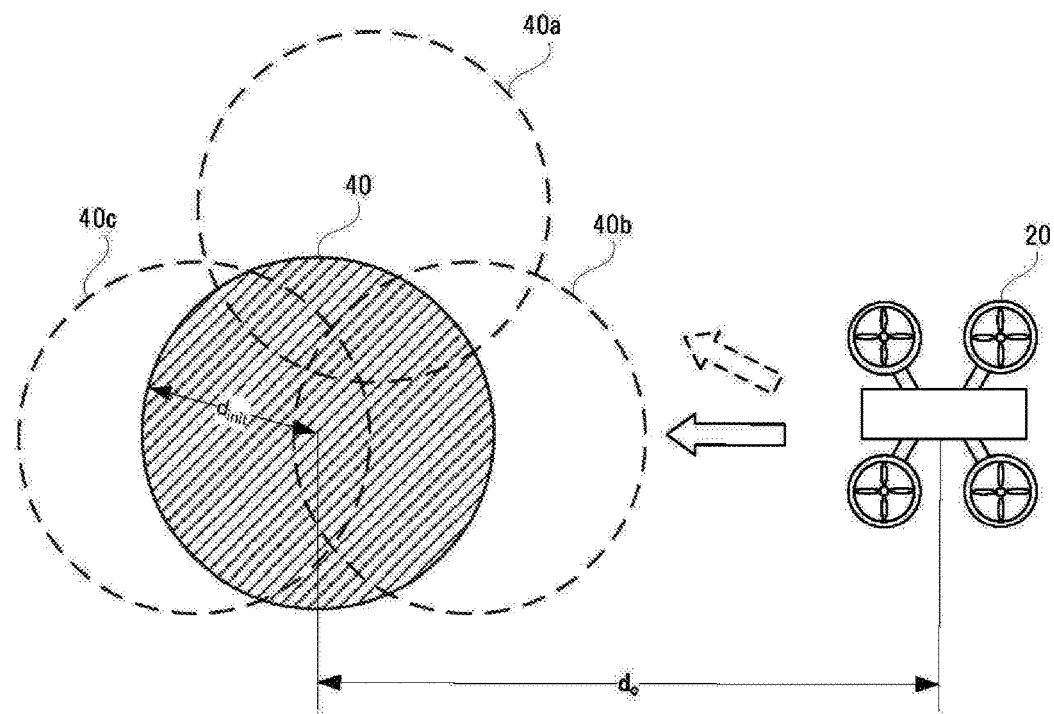

In the examples shown in FIGS. 3 and 4, the landing region is a region obtained by projecting the unmanned aircraft 20 onto the ground. The landing region can be approximated by a circle (radius: $d_{init}$) having a diameter equal to one of the total length, the total width, and the diagonal length of the unmanned aircraft 20 that is the longest. The following description assumes that the landing region is a circle having a radius $d_{init}$. In FIGS. 3(a) and 3(b), and FIGS. 4(a) and 4(b), a diagonally hatched region 40 indicates the landing region.

First, let us consider a case where the unmanned aircraft 20 crashes from a state in which it is hovering. In this case, as shown in FIGS. 3(a) and 3(b), the unmanned aircraft 20 falls substantially vertically. Accordingly, the landing region 40 will be located directly below the unmanned aircraft 20.

Therefore, when the speed v of the unmanned aircraft 20 is 0 (zero), the collision determination unit 13 sets the landing region 40 at a position directly below the unmanned aircraft 20, as shown in FIG. 3(a). Next, the collision determination unit 13 determines whether the distance d, which is the horizontal distance between the boundary of the flight-restricted region 30 and the center of the unmanned aircraft 20, is smaller than the radius $d_{init}$ of the unmanned aircraft 20. Then, if the result of the determination indicates that the distance d is smaller than the radius $d_{init}$, the collision determination unit 13 determines that the unmanned aircraft 20 lands in the flight-restricted region 30 since the landing region 40 overlaps the flight-restricted region 30.

Next, let us consider a case where the unmanned aircraft 20 crashes from the state in which it is moving in the air. In this case, the unmanned aircraft 20 crashes while flying in a parabola in the advancing direction. Accordingly, as shown in FIGS. 4(a) and 4(b), the landing region 40 will be located away from a position directly below the unmanned aircraft 20.

First, when the speed v of the unmanned aircraft 20 is greater than 0 (zero), the collision determination unit 13 also calculates the distance d, which is the horizontal distance between the flight-restricted region 30 and the center of the unmanned aircraft 20, as in the example shown in FIGS. 3(a) and 3(b). Next, the collision determination unit 13 calculates the distance (hereinafter referred to as "horizontal movement distance") $d_c$ that the unmanned aircraft moves in the horizontal direction before crashing, by assigning the altitude h and the speed v of the unmanned aircraft 20 into Expression 1 below. Note that "g" in Expression 1 below represents the gravitational acceleration.

$$d_c = v\sqrt{\frac{2h}{g}} \qquad \text{[Expression 1]}$$

Next, the collision determination unit 13 sets the landing region 40 as a circle having a radius $d_{init}$ at a position away from the current position of the unmanned aircraft 20 by the horizontal movement distance in the advancing direction. However, when the advancing direction of the unmanned aircraft 20 has changed, the landing region 40 moves to the position of a region 40a shown in FIG. 4(b), for example. The landing region 40 moves to the position of a region 40b when the speed of the unmanned aircraft 20 has decreased, and moves to the position of a region 40c when the speed of the unmanned aircraft 20 has increased.

Then, when the unmanned aircraft 20 is moving, the flight-restricted region 30 is present on the advancing direction side as described above, and, therefore, the collision determination unit 13 determines whether the distance d satisfies Expression 2 below.

$$(d_c - d_{init}) \leq d \leq (d_c + d_{init}) \qquad \text{[Expression 2]}$$

Then, if the result of the determination indicates that the distance d satisfies Expression 2 above, the collision determination unit 13 determines that the unmanned aircraft 20 lands in the flight-restricted region 30 since the landing region 40 overlaps the flight-restricted region 30.

In the first embodiment, if the collision determination unit 13 determines that the unmanned aircraft 20 lands in the flight-restricted region 30, the collision determination unit 13 can instruct the unmanned aircraft 20 to take an action so as not to land in the flight-restricted region 30 even if the unmanned aircraft 20 crashes. Examples of such an action include moving away from the flight-restricted region 30, reducing the movement speed, and decreasing the altitude.

Specifically, the collision determination unit 13 creates an instruction (hereinafter referred to as "avoidance instruction") instructing to change the direction of the unmanned aircraft 20, decrease the movement speed, or decrease the altitude, for example. Then, the collision determination unit 13 transmits the created avoidance instruction to the unmanned aircraft 20 via the wireless communication unit 14. In this case, in the unmanned aircraft 20, the data processing unit 21 adjusts the thrust of each of the thrust producing units 23 in accordance with the content of the instruction, and causes the unmanned aircraft 20 to change the direction, decrease the speed, or decrease the altitude.

Further, in the first embodiment, if the collision determination unit 13 determines that the unmanned aircraft 20 lands in the flight-restricted region 30, the collision determination unit 13 can alert the manager, the pilot, or the like of the unmanned aircraft 20 to the landing of the flight-restricted region 30, for example, by using one or both of sound and light. Specifically, the collision determination unit 13 transmits, to an information terminal owned by the manager, the pilot, or the like, a notification indicating that the unmanned aircraft 20 may land in the flight-restricted region 30 in case of a crash, and outputs an alert by using the display and the speaker of the information terminal.

Device Operations

Figure 5:
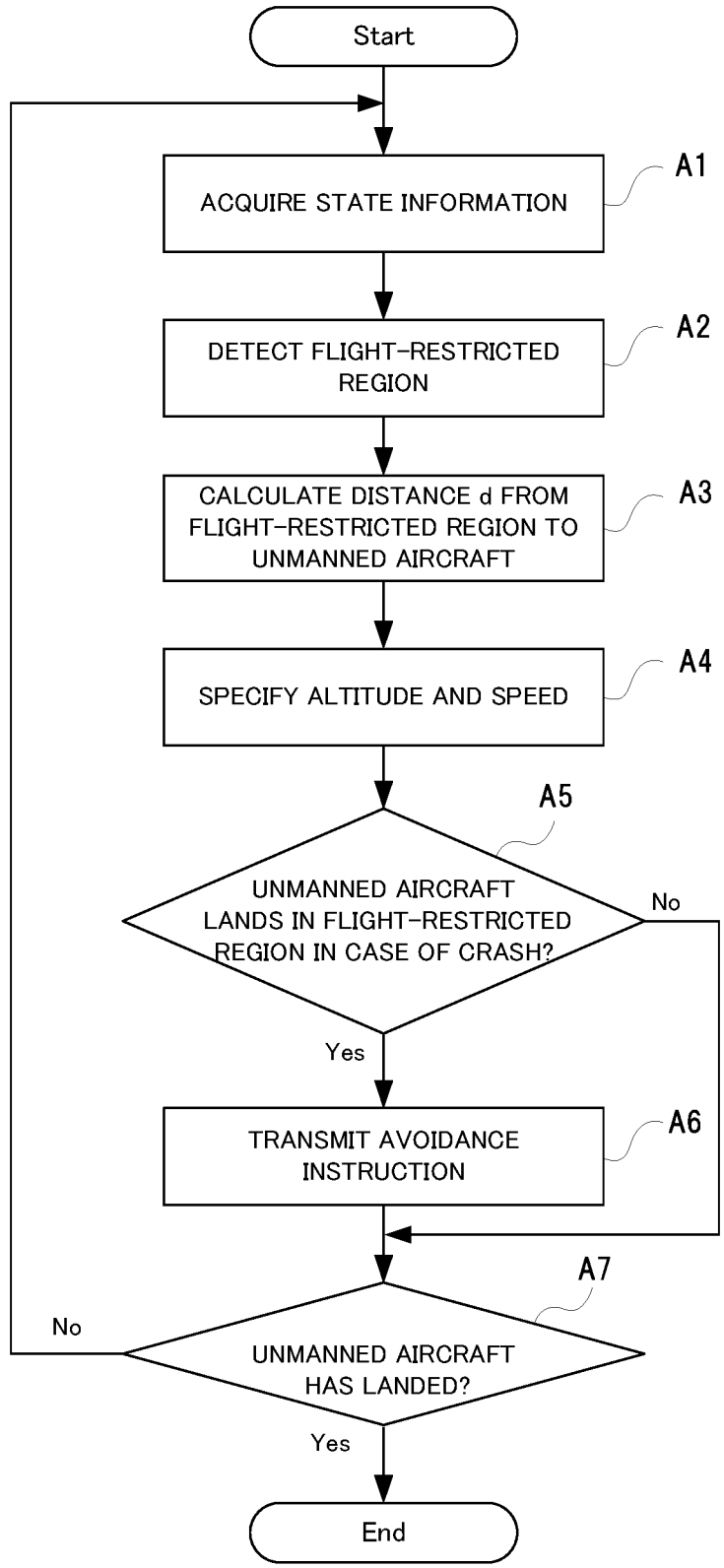
FIG. 5 is a flowchart showing operations of the flight control device according to the first embodiment of the present invention.

Next, operations of the flight control device 10 according to the first embodiment of the present invention will be described with reference to FIG. 5. FIG. 5 is a flowchart showing operations of the flight control device according to the first embodiment of the present invention. In the following description, reference will be made to FIGS. 1 to 4 as needed. In the first embodiment, a flight control method is performed by causing the flight control device 10 to operate. Accordingly, the following description of the operations of the flight control device 10 is substituted for the description of the flight control method according to the first embodiment.

First, as shown in FIG. 5, in the flight control device 10, when the state information transmitted from the unmanned aircraft 20 is received by the wireless communication unit 14, the region detection unit 11 acquires the received state information (step A1).

Next, the region detection unit 11 specifies the position of the unmanned aircraft 20, based on the state information acquired in step A1, and detects the flight-restricted region 30 present in the vicinity of the specified position from the electronic map data 15 (step A2). Specifically, the region detection unit 11 checks the specified position of the unmanned aircraft 20 against the electronic map data, and detects the region set as the flight-restricted region 30 from a set range (e.g., a range within a radius of 100 m) centered on the specified position.

Next, the distance calculation unit 12 calculates the distance d from the flight-restricted region 30 to the unmanned aircraft 20, based on the position of the unmanned aircraft 20 specified in step A2 and the detected flight-restricted region (step A3). Specifically, the distance calculation unit 12 specifies the point on the boundary of the flight-restricted region 30 that is located closest to the unmanned aircraft 20, and calculates the horizontal distance from a given point (e.g., center point) of the unmanned aircraft 20 to the specified point. This distance is used as the distance d.

Next, the collision determination unit 13 specifies the altitude h and the speed v of the unmanned aircraft 20 from the state information transmitted from the unmanned aircraft 20 (step A4). Then, the collision determination unit 13 determines whether the unmanned aircraft 20 lands in the flight-restricted region 30 in case of a crash, based on the altitude h and the speed v specified in step A4 and the distance d calculated in step A3 (step A5).

Specifically, in step A5, the collision determination unit 13 sets the landing region in which the unmanned aircraft 20 lands if the unmanned aircraft 20 crashes, based on the altitude h and the speed v specified in step A4 (see FIG. 3(b) and FIG. 4(b)). Then, the collision determination unit 13 uses the distance d calculated in step A3 so as to judge whether the landing region 40 overlaps the flight-restricted region 30, thereby determining whether the unmanned aircraft 20 lands in the flight-restricted region 30.

If it is determined, as a result of the determination in step A5, that the unmanned aircraft 20 does not land in the flight-restricted region, the collision determination unit 13 executes step A7 described below. On the other hand, if it is determined, as a result of the determination in step A5, that the unmanned aircraft 20 lands in the flight-restricted region 30, the collision determination unit 13 creates an avoidance instruction, and transmits the created avoidance instruction to the unmanned aircraft 20 via the wireless communication unit 14 (step A6).

If it is determined, as a result of the determination in step A5, that the unmanned aircraft 20 lands in the flight-restricted region 30, the collision determination unit 13 may further alert the manager, the pilot, or the like of the unmanned aircraft 20 to the landing of the flight-restricted region 30 by using one or both of sound and light.

Next, if the result of the determination unit is step A5 is No, or step A6 is executed, the collision determination unit 13 determines whether the unmanned aircraft 20 has landed or not (step A7). If it is determined, as a result of the determination in step A7, that the unmanned aircraft 20 has not landed, step A1 is executed again. On the other hand, if it is determined, as a result of the determination in step A7, that the unmanned aircraft 20 has landed, the processing in the flight control device 10 stops.

Effects Achieved by First Embodiment

As described above, in the first embodiment, whether the unmanned aircraft 20 lands in a region set as the flight-restricted region 30 on the electronic map data in case of a crash is constantly determined. Accordingly, the occurrence of a collision accident due to a crash of the unmanned aircraft 20 can be suppressed when a region in which a crash of the unmanned aircraft 20 will cause a problem is set as the flight-restricted region 30 on the electronic map data.

In the first embodiment, when the unmanned aircraft 20 lands in the flight-restricted region 20 in the event of a crash, the avoidance instruction is transmitted to the unmanned aircraft 20, thus alerting the manager, the pilot, or the like. Accordingly, the occurrence of a collision accident can be further suppressed.

Program

The program used in the first embodiment may be any program that causes a computer to execute step A1 to A7 shown in FIG. 5. By installing this program into the computer and executing the program, the flight control device 10 and the flight control method according to the first embodiment can be implemented. In this case, the CPU (Central Processing unit) of the computer functions as the region detection unit 11, the distance calculation unit 12, and the collision determination unit 13 so as to execute the processing.

Modification

Figure 6:
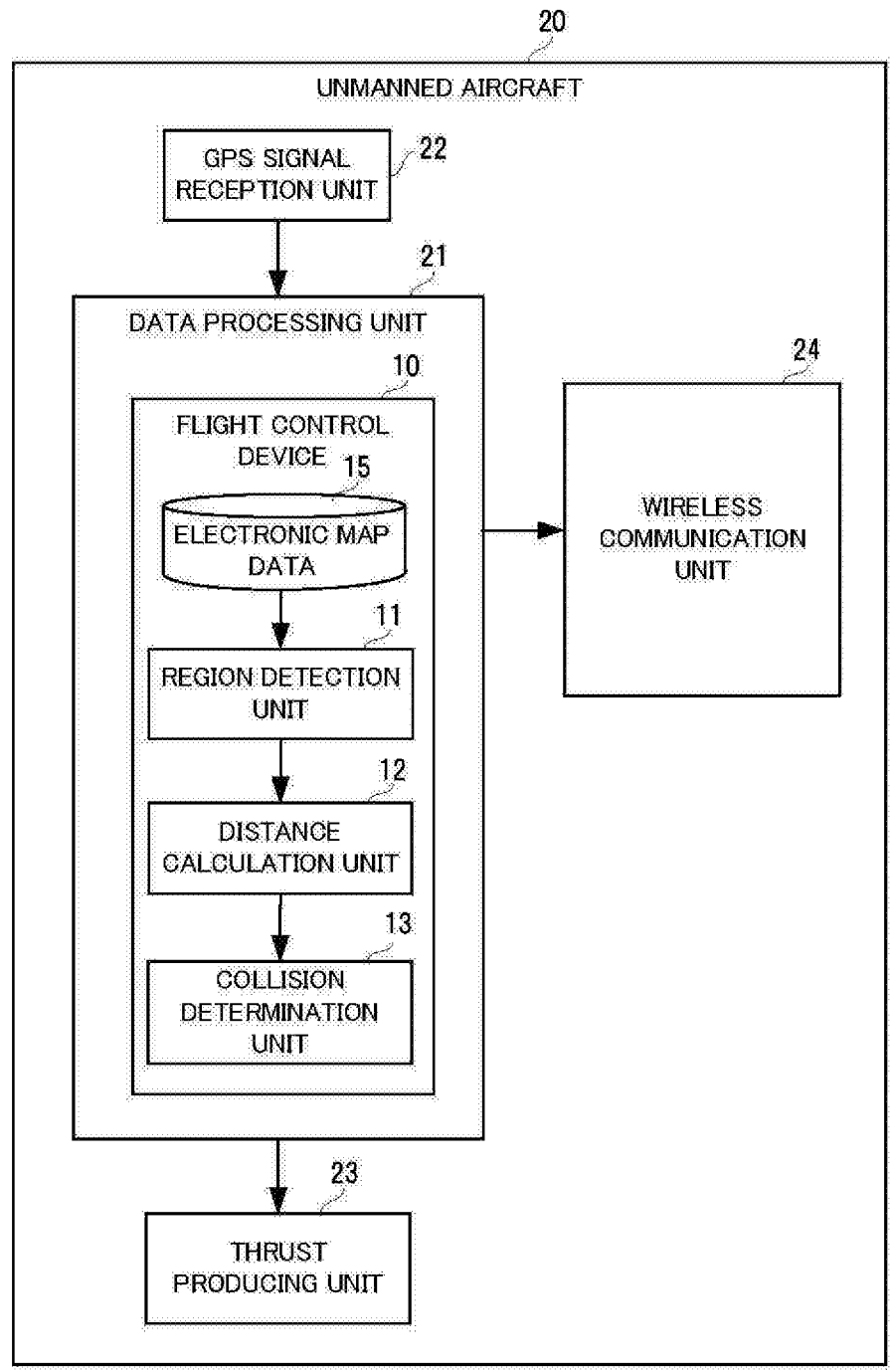
FIG. 6 is a block diagram specifically showing the configuration of a flight control device according to a modification of the embodiment of the present invention.

Next, a modification of the first embodiment will be described with reference to FIG. 6. FIG. 6 is a block diagram specifically showing a flight control device according to a modification of the embodiment of the present invention.

In the example shown in FIGS. 1 and 2, the flight control device 10 is provided outside the unmanned aircraft 20. In contrast, as shown in FIG. 6, the flight control device 10 according to the present modification is configured inside the data processing unit 21 of the unmanned aircraft 20.

Specifically, the present modification is implemented by installing, into a computer mounted to the unmanned aircraft 20, a program for implementing the flight control device 10, and executing the program. According to the present modification, even when the unmanned aircraft 20 becomes unable to perform wireless communication with an external entity, it is possible to avoid a situation where the unmanned aircraft 20 lands in the flight-restricted region 30 in the event of a crash.

Second Embodiment

Figure 7:
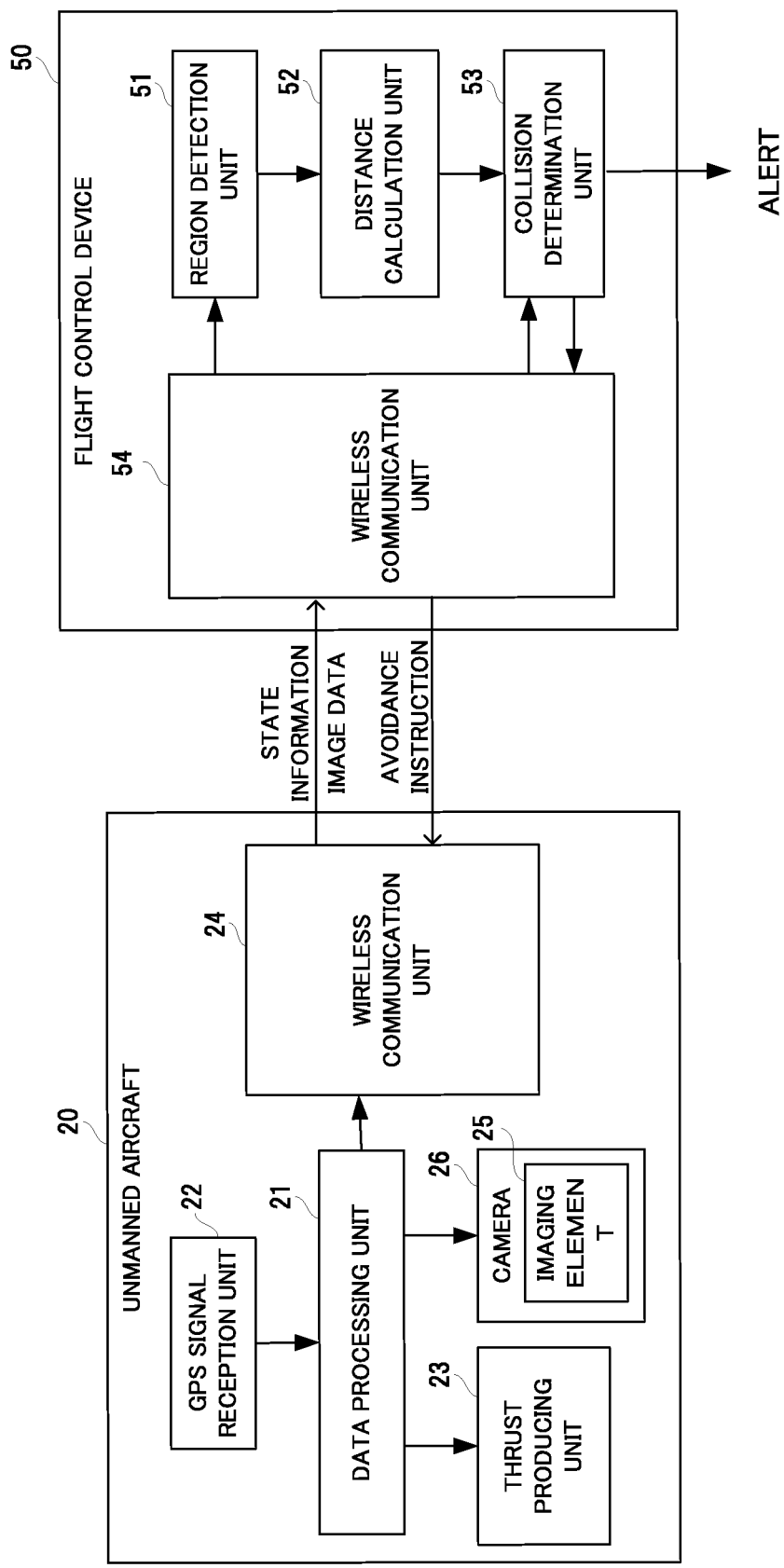
FIG. 7 is a block diagram specifically showing the configuration of a flight control device according to a second embodiment of the present invention.
Figure 8:
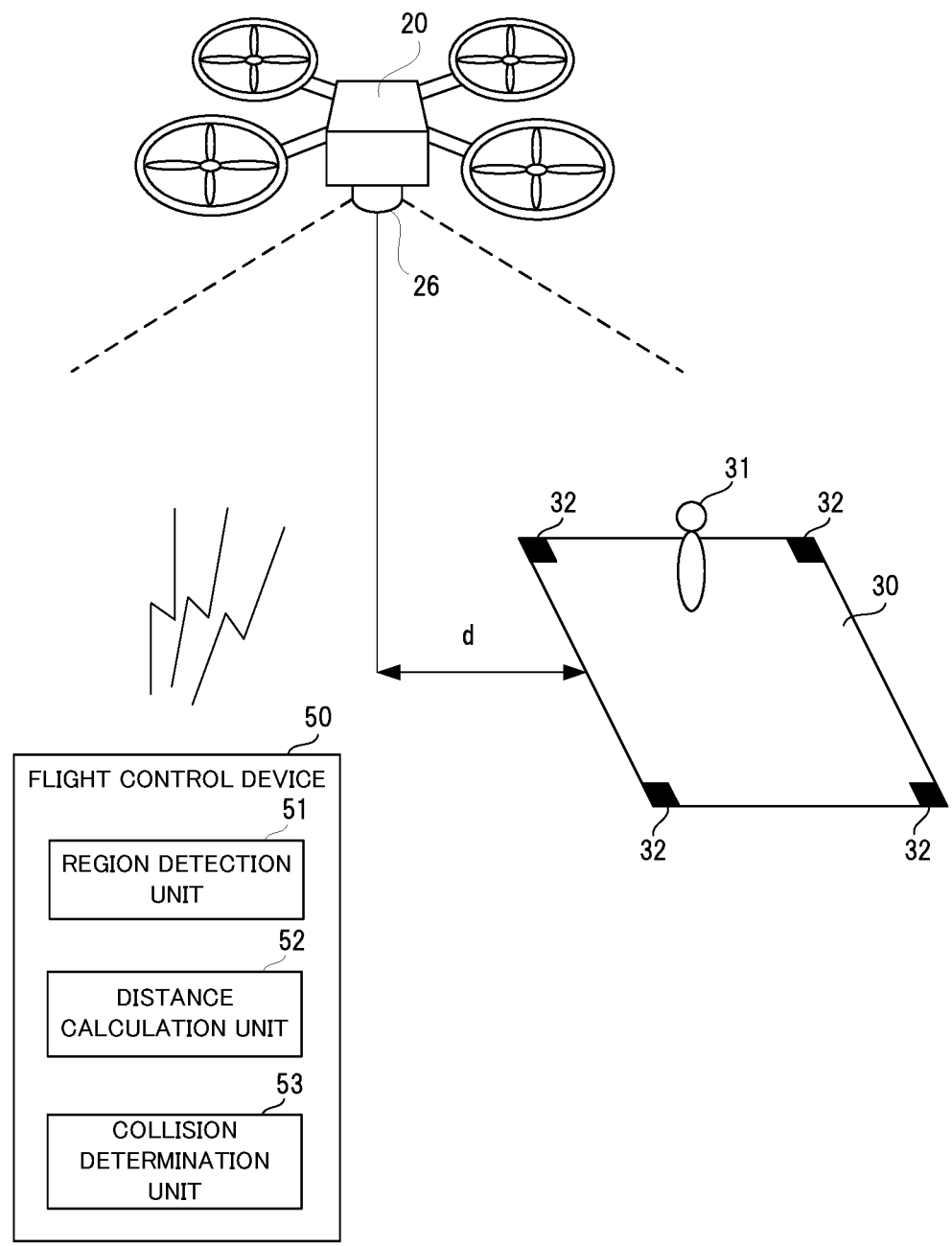
FIG. 8 is a diagram illustrating processing for detecting a flight-restricted region according to the second embodiment.

Next, a flight control device, a flight control method, and a program according to a second embodiment of the present invention will be described with reference to FIGS. 7 and 8. FIG. 7 is a block diagram specifically showing the configuration of a flight control device according to the second embodiment of the present invention. FIG. 8 is a diagram illustrating processing for detecting a flight-restricted region according to the second embodiment. In addition, FIG. 7 also discloses the configuration of an unmanned aircraft that is to be controlled.

In the second embodiment, the unmanned aircraft 20 transmits image data generated from a pixel signal, in addition to the state information. Accordingly, a flight control device 50 performs, based on the transmitted image data, detection of the flight-restricted region 30 and calculation of the distance d from the flight-restricted region 30 to the unmanned aircraft 20. The following description is focused on the difference between the second embodiment and the first embodiment.

As shown in FIG. 7, unlike the first embodiment, the unmanned aircraft 20 in the second embodiment includes an imaging element 25 that outputs a pixel signal in accordance with received light. The imaging element 25 is included in a camera 26, and the camera 26 generates image data from the pixel signal, and outputs the image data. As shown in FIG. 8, the camera 26 is attached to the unmanned aircraft 20 such that an image of the area below the unmanned aircraft 20 is captured.

Accordingly, as shown in FIG. 8, when the unmanned aircraft 20 approaches the flight-restricted region 30, the camera 26 captures an image of markers 32 disposed at an outer edge of the flight-restricted region 30, so that image data in which the markers 32 have been imaged is transmitted to a flight control device 60.

The flight control device 50 according to the second embodiment detects the flight-restricted region 30 by using the transmitted image data. Specifically, in the second embodiment, a region detection unit 51 detects the markers 32 disposed at the outer edge of the flight-restricted region 30, based on the image data transmitted from the unmanned aircraft 20.

Further, the region detection unit 51 detects the flight-restricted region 30, based on the detected markers 32. For example, the region detection unit 51 detects the flight-restricted region 30 by connecting the detected markers 32 with straight lines. In the second embodiment, the markers 32 may have a distinctive color, shape, or the like so that they can be easily recognized by image recognition.

Then, in the second embodiment, a distance calculation unit 52 can calculate the distance d from the flight-restricted region 30 to the unmanned aircraft 20 from the sizes and the positions of the markers 32 in the image data.

In the second embodiment, the flight control device 50 may include electronic map data in which the positions of the markers 32 are recorded. In this case, the distance calculation unit 52 specifies the positions of the markers 32 by fitting the detected markers 32 in the electronic map data. In addition, the distance calculation unit 52 also specifies the position of the unmanned aircraft 20 on the electronic map data from the sizes and the positions of the markers 32 in the image data and the specified positions of the markers 32. Then, the distance calculation unit 52 calculates the distance d, based on the positions of the markers 32 and the position of the unmanned aircraft 20 on the electronic map data.

In the second embodiment, a collision determination unit 53 executes the same processing as in the first embodiment. For example, the collision determination unit 53 specifies the altitude h and the speed v of the unmanned aircraft 20 in the same manner as in the first embodiment, and determines whether the unmanned aircraft 20 lands in the flight-restricted region 30 in case of a crash, based on the altitude h and the speed v, as well as the distance d.

In the second embodiment as well, the processing is executed following steps A1 to A7 shown in FIG. 5, thereby performing the flight control method. Note, however, that unlike the first embodiment, steps A2 and A3 are executed based on the image data in the second embodiment.

Effects Achieved by Second Embodiment

As described above, in the second embodiment as well, whether the unmanned aircraft 20 lands in a region set as the flight-restricted region 30 in case of a crash is constantly determined. Accordingly, the occurrence of a collision accident due to a crash of the unmanned aircraft 20 can be suppressed when a region in which a crash of the unmanned aircraft 20 will cause a problem is set as the flight-restricted region 30 on the electronic map data. In the second embodiment, the flight-restricted region 30 can be set by providing the markers 32 on the ground, and, therefore, the flight-restricted region 30 easily can be newly provided or changed.

Third Embodiment

Figure 9:
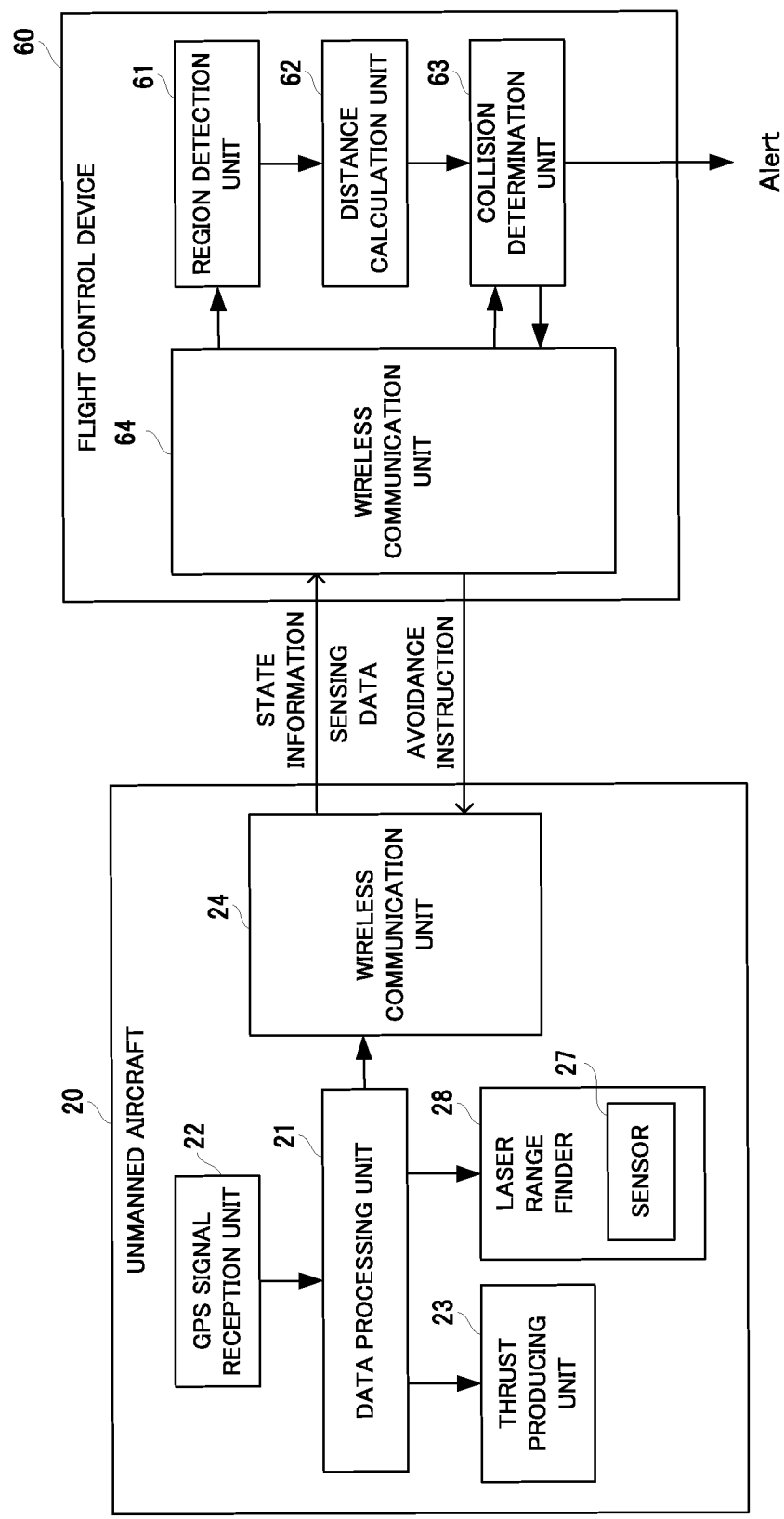
FIG. 9 is a block diagram specifically showing the configuration of a flight control device according to a third embodiment of the present invention.
Figure 10:
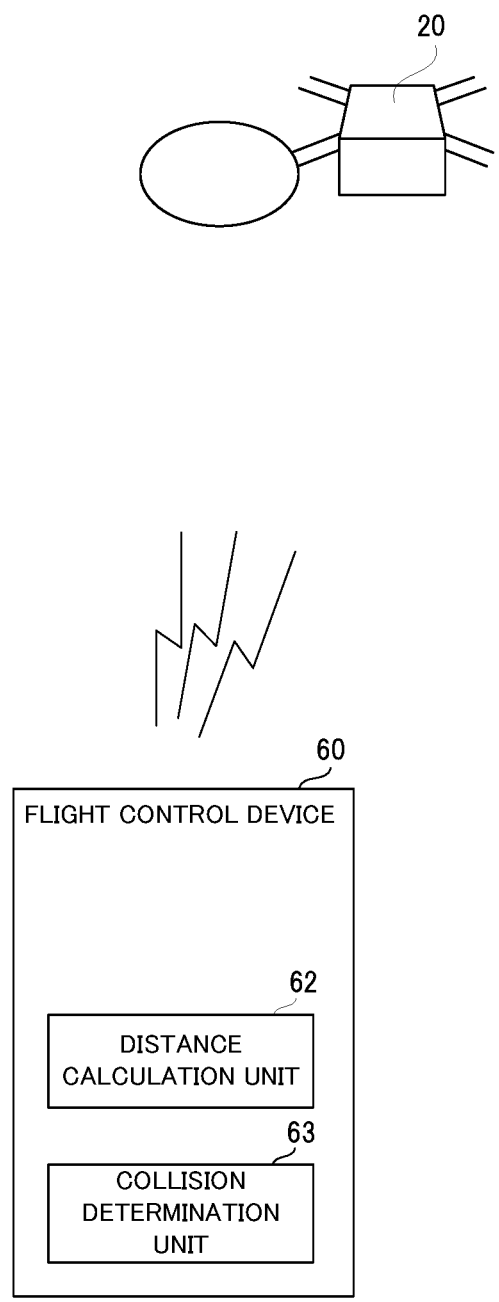
FIG. 10 is a diagram illustrating processing for detecting a flight-restricted region according to the third embodiment.

Next, a flight control device, a flight control method, and a program according to a third embodiment of the present invention will be described with reference to FIG. 9 and FIG. 10. FIG. 9 is a block diagram specifically showing the configuration of a flight control device according to the third embodiment of the present invention. FIG. 10 is a diagram illustrating processing for detecting a flight-restricted region according to the third embodiment. FIG. 9 also discloses the configuration of an unmanned aircraft that is to be controlled.

In the third embodiment, the unmanned aircraft 20 transmits sensing data specifying an object present below the unmanned aircraft, in addition to the state information. Accordingly, the flight control device 60 performs, based on the transmitted sensing data, detection of the flight-restricted region 30 and calculation of the distance d from the flight-restricted region 30 to the unmanned aircraft 20. The following description is focused on the difference between the third embodiment and the first embodiment.

As shown in FIG. 9, unlike the first embodiment, the unmanned aircraft 20 in the third embodiment includes a sensor 27 whose output signal changes in characteristics in accordance with an object present below the unmanned aircraft. Specifically, the sensor 27 includes a light source that emits light, and a light-receiving element that receives the light reflected at an object. Since the output signal of the light-receiving element changes in characteristics in accordance with the object present, the sensing data is generated from the output signal.

In the third embodiment, a laser is used as the light source, and the sensor 27 constitutes a laser range finder 28. The laser range finder 28 can specify an object present in a wide range by scanning the laser light emitted from the sensor 27 in directions of two axes. Note that the wavelength of the light emitted from the light source is not particularly limited, and infrared light may be emitted from the light source. When infrared light is emitted from the light source, the sensor 27 constitutes a depth camera.

Accordingly, as shown in FIG. 10, when the unmanned aircraft 20 approaches the flight-restricted region 30, objects 33 on or at a peripheral portion of the flight-restricted region 30 are detected by the laser range finder 28, and the sensing data specifying the detected objects 33 is transmitted to the flight control device 60.

The flight control device 60 in the third embodiment specifies the sizes and the positions of the objects 33 from the transmitted sensing data. Specifically, in the third embodiment, a region detection unit 61 analyzes the sensing data so as to specify the change in characteristics of the output signal of the sensor 27, and specifies the sizes and the positions of the objects 33 present on and at a peripheral portion of the flight-restricted region 30, based on the specified change in characteristics.

The region detection unit 61 detects the flight-restricted region 30, based on the specified objects 33. Specifically, the region detection unit 61 detects the flight-restricted region 30 by fitting the positions of the detected objects 33 in a pre-registered relationship between the objects 33 and the flight-restricted region 30.

Further, a distance calculation unit 62 calculates the distance d from the flight-restricted region 30 to the unmanned aircraft 20 by fitting the distances to the detected objects 33 in the above-described relationship between the objects 33 and the flight-restricted region 30.

In the third embodiment, the flight control device 60 may include electronic map data in which the positions of the objects 33 are recorded. In this case, the distance calculation unit 62 specifies the positions of the objects 33 by fitting the detected objects 33 in the electronic map data. The distance calculation unit 62 also specifies the position of the unmanned aircraft 20 on the electronic map data from the distances to the detected objects 33 and the specified positions of the objects 33. Then, the distance calculation unit 62 calculates the distance d, based on the position of each of the objects 33 on the electronic map data and the position of the unmanned aircraft 20.

In the third embodiment, a collision determination unit 63 executes the same processing as in the first embodiment. For example, the collision determination unit 63 specifies the altitude h and the speed v of the unmanned aircraft 20 in the same manner as in the first embodiment, and determines whether the unmanned aircraft 20 lands in the flight-restricted region 30 in case of a crash, based on the altitude h and the speed v, as well as the distance d.

In the third embodiment as well, the processing is executed following steps A1 to A7 shown in FIG. 5, thereby performing the flight control method. Note, however, that, unlike the first embodiment, steps A2 and A3 are executed asked on the sensing data in the third embodiment.

Effects Achieved by Third Embodiment

Thus, in the third embodiment as well, whether the unmanned aircraft 20 lands in a region set as the flight-restricted region 30 in case of a crash is constantly determined. Accordingly, the occurrence of a collision accident due to a crash of the unmanned aircraft 20 can be suppressed when a region in which a crash of the unmanned aircraft 20 will cause a problem is set as the flight-restricted region 30. In the third embodiment, the flight-restricted region 30 can be set by registering the objects 33 (e.g., buildings or the like) present thereon or at a peripheral portion thereof, and, therefore, the flight-restricted region 30 easily can be newly provided or changed, as in the second embodiment.

Physical Configuration

The program used in the first to third embodiments may be any program that causes the computer to execute steps A1 to A7 shown in FIG. 5. By installing this program into the computer and executing the program, the flight control devices and the flight control methods according to the first to third embodiments can be implemented. In this case, the CPU (Central Processing unit) of the computer functions as the region detection unit, the distance calculation unit, and the collision determination unit so as to execute the processing.

Note that the program used in the first to third embodiments may be executed by a computer system configured by a plurality of computers. In this case, for example, each of the computers may function as one of the region detection unit, the distance calculation unit, and the collision determination unit.

Figure 11:
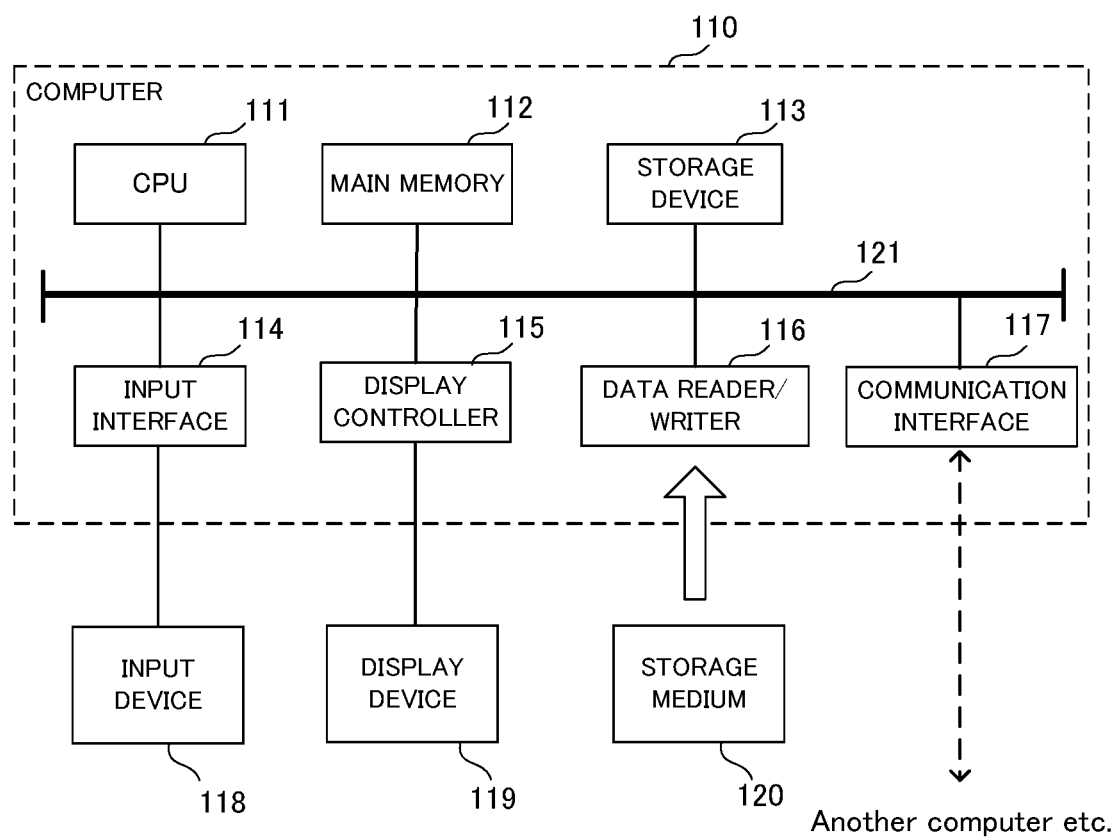
FIG. 11 is a block diagram showing an example of a computer implementing the flight control devices according to the first to third embodiments of the present invention.

Here, a computer that implements a flight control device by executing the program used in the first to third embodiments will be described with reference to the drawing. FIG. 11 is a block diagram showing an example of a computer that implements the flight control devices according to the first to third embodiments of the present invention.

As shown in FIG. 11, a computer 110 includes a CPU 111, a main memory 112, a storage device 113, an input interface 114, a display controller 115, a data reader/writer 116, and a communication interface 117. These various units are connected via a bus 121 so as to be capable of data communication with each other.

The CPU 111 loads, into the main memory 112, a program (codes) used in the present embodiments that is stored in the storage device 113, and executes these codes in a predetermined order, thereby performing various calculations. Typically, the main memory 112 is a volatile storage device such as a DRAM (Dynamic Random Access Memory). The program used in the present embodiments is provided in the state of being stored in a computer-readable recording medium 120. Note that the program used in the present embodiments may be distributed over the Internet connected via the communication interface 117.

Specific examples of the storage device 113 include a hard disk drive and a semiconductor storage device such as a flash memory. The input interface 114 mediates the data transfer between the CPU 111 and an input device 118 such as a keyboard and a mouse. The display controller 115 is connected to a display device 119, and controls the display on the display device 119.

The data reader/writer 116 mediates the data transfer between the CPU 111 and the recording medium 120, reads out the program from the recording medium 120, and writes the results of the processing executed in the computer 110 into the recording medium 120. The communication interface 117 mediates the data transfer between the CPU 111 and another computer.

Specific examples of the recording medium 120 include a general-purpose semiconductor storage device such as a CF (Compact Flash (®)) and an SD (Secure Digital), a magnetic storage medium such as a flexible disk (Flexible Disk), and an optical storage medium such as a CD-ROM (Compact Disk Read Only Memory).

Note that the flight control device according to each of the first to third embodiments can also be implemented by pieces of hardware corresponding to various units, rather than a computer having a program installed thereon. Further, part of the flight control device may be implemented by a program, and the rest may be implemented by hardware.

Some or all of the above-described embodiments can be represented by (Supplementary notes 1) to (Supplementary note 21) described below, but are not limited to the following.

(Supplementary Note 1)

A flight control device for controlling an unmanned aircraft, comprising:

a region detection unit that detects a flight-restricted region in which flight is restricted;

a distance calculation unit that calculates a distance from the flight-restricted region to the unmanned aircraft; and a collision determination unit that specifies an altitude and a speed of the unmanned aircraft, and determines whether the unmanned aircraft lands in the flight-restricted region in case of a crash, based on the altitude and the speed that have been specified and the calculated distance.

(Supplementary Note 2)

The flight control device according to supplementary note 1, wherein the unmanned aircraft includes a GPS signal reception unit that receives a GPS signal from a satellite, the region detection unit detects the flight-restricted region, based on electronic map data that has been created in advance, and the distance calculation unit calculates the distance from the flight-restricted region to the unmanned aircraft, based on a position of the unmanned aircraft that is specified by the GPS signal and a position of the detected flight-restricted region.

(Supplementary Note 3)

The flight control device according to supplementary note 1, wherein the unmanned aircraft includes an imaging element that outputs a pixel signal in accordance with received light, the region detection unit detects a marker disposed at an outer edge of the flight-restricted region, based on image data that has been generated from the pixel signal, and detects the flight-restricted region, based on the detected marker, and the distance calculation unit calculates the distance from the flight-restricted region to the unmanned aircraft, from a size and a position of the marker in the image data.

(Supplementary Note 4)

The flight control device according to supplementary note 1, wherein the unmanned aircraft includes an imaging element that outputs a pixel signal in accordance with received light, the region detection unit detects a marker disposed at an outer edge of the flight-restricted region, based on image data that has been generated from the pixel signal, and detects a position of the unmanned aircraft and the flight-restricted region by checking the detected marker against electronic map data in which a position of the marker is registered, and the distance calculation unit calculates the distance from the flight-restricted region to the unmanned aircraft, based on the position of the unmanned aircraft and the flight-restricted region that have been detected.

(Supplementary Note 5)

The flight control device according to supplementary note 1, wherein the unmanned aircraft includes a sensor whose output signal changes in characteristics in accordance with an object present therebelow, the region detection unit detects the flight-restricted region by detecting an object present on or at a peripheral portion of the flight-restricted region, based on a change in characteristics of the output signal, and the distance calculation unit calculates the distance from the flight-restricted region to the unmanned aircraft, based on a distance to the detected object.

(Supplementary Note 6)

The flight control device according to supplementary note 1, wherein the unmanned aircraft includes a sensor whose output signal changes in characteristics in accordance with an object present therebelow, the region detection unit detects an object present on or at a peripheral portion of the flight-restricted region, based on a change in characteristics of the output signal, and detects a position of the unmanned aircraft and the flight-restricted region by checking the detected object against electronic map data in which a position of the object is registered, and the distance calculation unit calculates the distance from the flight-restricted region to the unmanned aircraft, based on the position of the unmanned aircraft and the flight-restricted region that have been detected.

(Supplementary Note 7)

The flight control device according to supplementary note 1, wherein, if the collision determination unit determines that the unmanned aircraft lands in the flight-restricted region, the collision determination unit instructs the unmanned aircraft to take an action so as not to land in the flight-restricted region even if the unmanned aircraft crashes.

(Supplementary Note 8)

A flight control method for controlling an unmanned aircraft, comprising the steps of:

(a) detecting a flight-restricted region in which flight is restricted;

(b) calculating a distance from the flight-restricted region to the unmanned aircraft; and (c) specifying an altitude and a speed of the unmanned aircraft, and determining whether the unmanned aircraft lands in the flight-restricted region in case of a crash, based on the altitude and the speed that have been specified and the calculated distance.

(Supplementary Note 9)

The flight control method according to supplementary note 8, wherein the unmanned aircraft includes a GPS signal reception unit that receives a GPS signal from a satellite, in the step (a), the flight-restricted region is detected, based on electronic map data that has been created in advance, and, in the step (b), the distance from the flight-restricted region to the unmanned aircraft is calculated, based on a position of the unmanned aircraft that is specified by the GPS signal and a position of the detected flight-restricted region.

(Supplementary Note 10)

The flight control method according to supplementary note 8, wherein the unmanned aircraft includes an imaging element that outputs a pixel signal in accordance with received light, in the step (a), a marker disposed at an outer edge of the flight-restricted region is detected, based on image data that has been generated from the pixel signal, and detects the flight-restricted region, based on the detected marker, and, in the step (b), the distance from the flight-restricted region to the unmanned aircraft is calculated, based on a size and a position of the marker in the image data.

(Supplementary Note 11)

The flight control method according to supplementary note 8, wherein the unmanned aircraft includes an imaging element that outputs a pixel signal in accordance with received light, in the step (a), a marker disposed at an outer edge of the flight-restricted region is detected, based on image data that has been generated from the pixel signal, and a position of the unmanned aircraft and the flight-restricted region is detected by checking the detected marker against electronic map data in which a position of the marker is registered, and, in the step (b), the distance from the flight-restricted region to the unmanned aircraft is calculated, based on the position of the unmanned aircraft and the flight-restricted region that have been detected.

(Supplementary Note 12)

The flight control method according to supplementary note 8, wherein the unmanned aircraft includes a sensor whose output signal changes in characteristics in accordance with an object present therebelow, in the step (a), the flight-restricted region by detecting an object present on or at a peripheral portion of the flight-restricted region is detected, based on a change in characteristics of the output signal, and, in the step (b), the distance from the flight-restricted region to the unmanned aircraft is calculated, based on a distance to the detected object.

(Supplementary Note 13)

The flight control method according to supplementary note 8, wherein the unmanned aircraft includes a sensor whose output signal changes in characteristics in accordance with an object present therebelow, in the step (a), an object present on or at a peripheral portion of the flight-restricted region is detected, based on a change in characteristics of the output signal, and detects a position of the unmanned aircraft and the flight-restricted region by checking the detected object against electronic map data in which a position of the object is registered, and, in the step (b), the distance from the flight-restricted region to the unmanned aircraft is calculated, based on the position of the unmanned aircraft and the flight-restricted region that have been detected.

(Supplementary Note 14)

The flight control method according to supplementary note 8, further comprising the step of (d) in the step (c), instructing, if it is determined that the unmanned aircraft lands in the flight-restricted region, the unmanned aircraft to take an action so as not to land in the flight-restricted region even if the unmanned aircraft crashes.

(Supplementary Note 15)

A computer-readable recording medium having recorded thereon a program for controlling an unmanned aircraft by using a computer, the program comprising instructions to cause the computer to execute the steps of:

(a) detecting a flight-restricted region in which flight is restricted;

(b) calculating a distance from the flight-restricted region to the unmanned aircraft; and (c) specifying an altitude and a speed of the unmanned aircraft, and determining whether the unmanned aircraft lands in the flight-restricted region in case of a crash, based on the altitude and the speed that have been specified and the calculated distance.

(Supplementary Note 16)

The computer-readable recording medium according to supplementary note 15, wherein the unmanned aircraft includes a GPS signal reception unit that receives a GPS signal from a satellite, in the step (a), the flight-restricted region is detected from electronic map data that has been created in advance, and, in the step (b), the distance from the flight-restricted region to the unmanned aircraft is calculated, based on a position of the unmanned aircraft that is specified by the GPS signal and a position of the detected flight-restricted region.

(Supplementary Note 17)

The computer-readable recording medium according to supplementary note 15, wherein the unmanned aircraft includes an imaging element that outputs a pixel signal in accordance with received light, in the step (a), a marker disposed at an outer edge of the flight-restricted region is detected, based on image data that has been generated from the pixel signal, and detects the flight-restricted region, based on the detected marker, and, in the step (b), the distance from the flight-restricted region to the unmanned aircraft is calculated, based on a size and a position of the marker in the image data.

(Supplementary Note 18)

The computer-readable recording medium according to supplementary note 15, wherein the unmanned aircraft includes an imaging element that outputs a pixel signal in accordance with received light, in the step (a), a marker disposed at an outer edge of the flight-restricted region is detected, based on image data that has been generated from the pixel signal, and a position of the unmanned aircraft and the flight-restricted region is detected by checking the detected marker against electronic map data in which a position of the marker is registered, and, in the step (b), the distance from the flight-restricted region to the unmanned aircraft is calculated, based on the position of the unmanned aircraft and the flight-restricted region that have been detected.

(Supplementary Note 19)

The computer-readable recording medium according to supplementary note 15, wherein the unmanned aircraft includes a sensor whose output signal changes in characteristics in accordance with an object present therebelow, in the step (a), the flight-restricted region by detecting an object present on or at a peripheral portion of the flight-restricted region is detected, based on a change in characteristics of the output signal, and, in the step (b), the distance from the flight-restricted region to the unmanned aircraft is calculated, based on a distance to the detected object.

(Supplementary Note 20)

The computer-readable recording medium according to supplementary note 15, wherein the unmanned aircraft includes a sensor whose output signal changes in characteristics in accordance with an object present therebelow, in the step (a), an object present on or at a peripheral portion of the flight-restricted region is detected, based on a change in characteristics of the output signal, and detects a position of the unmanned aircraft and the flight-restricted region by checking the detected object against electronic map data in which a position of the object is registered, and, in the step (b), the distance from the flight-restricted region to the unmanned aircraft is calculated, based on the position of the unmanned aircraft and the flight-restricted region that have been detected.

(Supplementary Note 21)

The computer-readable recording medium according to supplementary note 15, wherein the program further comprises an instruction to cause the compute to execute the step of, (d) in the step (c), instructing, if it is determined that the unmanned aircraft lands in the flight-restricted region, the unmanned aircraft to take an action so as not to land in the flight-restricted region even if the unmanned aircraft crashes.

Although the present invention has been described above with reference to the embodiments, the present invention is not limited to the above-described embodiments. Various modifications that can be understood by a person skilled in the art may be made to the configuration and the details of the present invention within the scope of the invention.

This application claims priority to Japanese Patent Application No. 2015-219781, filed on Nov. 9, 2015, the disclosure of which is incorporated in its entirety herein by reference.

INDUSTRIAL APPLICABILITY

As described above, according to the present invention, it is possible to suppress the occurrence of a collision accident due to a crash of an unmanned aircraft. The present invention is applicable, without limitation, to any field to which an unmanned aircraft is used.

LIST OF REFERENCE SIGNS

10 Flight control device (first embodiment)
11 Region detection unit
12 Distance calculation unit
13 Collision determination unit
14 Wireless communication unit
15 Electronic map data
20 Unmanned aircraft
21 Data processing unit
22 GPS signal reception unit
23 Thrust producing unit
24 Wireless communication unit
25 Imaging element
26 Camera
27 Sensor
28 Laser range finder
30 Flight-restricted region
31 Person
40 Landing region
50 Flight control device (second embodiment)
51 Region detection unit
52 Distance calculation unit
53 Collision determination unit
54 Wireless communication unit
60 Flight control device (third embodiment)
61 Region detection unit
62 Distance calculation unit
63 Collision determination unit
64 Wireless communication unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A flight control device for controlling an unmanned aircraft, comprising:

a region detection unit realized by a computer and that detects a flight-restricted region in which flight is restricted;

a distance calculation unit realized by the computer and that calculates a distance from the flight-restricted region to the unmanned aircraft; and a collision determination unit realized by the computer and that specifies an altitude and a speed of the unmanned aircraft, and determines whether the unmanned aircraft lands in the flight-restricted region in case of a crash, based on the altitude and the speed that have been specified and the calculated distance, wherein if the collision determination unit determines that the unmanned aircraft would land in the flight-restricted region in a crash, the collision determination unit instructs the unmanned aircraft to take an action so as not to land in the flight-restricted region even if the unmanned aircraft crashes, wherein a case where the unmanned aircraft is hovering, when the horizontal distance between the boundary of the flight-restricted region and the unmanned aircraft is smaller than a preset distance threshold, the collision determination unit determines that the unmanned aircraft is to land in the flight-restricted region since the landing distance overlaps the flight-restricted region, wherein in a case where the unmanned aircraft is moving, the collision determination unit determines that the unmanned aircraft is to land in the flight-restricted region since the landing distance overlaps the flight-restricted region, using the horizontal distance, the distance threshold, and the horizontal movement distance that moves in the horizontal direction before the unmanned aircraft crashes.

2. The flight control device according to claim 1, wherein the unmanned aircraft includes a GPS receiver that receives a GPS signal from a satellite, the region detection unit detects the flight-restricted region from electronic map data that has been created in advance, and the distance calculation unit calculates the distance from the flight-restricted region to the unmanned aircraft, based on a position of the unmanned aircraft that is specified by the GPS signal and a position of the detected flight-restricted region.

3. The flight control device according to claim 1, wherein
the unmanned aircraft includes a camera that outputs a pixel signal in accordance with received light,
the region detection unit detects a marker disposed at an outer edge of the flight-restricted region, based on image data that has been generated from the pixel signal, and detects the flight-restricted region, based on the detected marker, and
the distance calculation unit calculates the distance from the flight-restricted region to the unmanned aircraft, from a size and a position of the marker in the image data.

4. The flight control device according to claim 1, wherein
the unmanned aircraft includes a camera that outputs a pixel signal in accordance with received light,
the region detection unit detects a marker disposed at an outer edge of the flight-restricted region, based on image data that has been generated from the pixel signal, and detects a position of the unmanned aircraft and the flight-restricted region by checking the detected marker against electronic map data in which a position of the marker is registered, and
the distance calculation unit calculates the distance from the flight-restricted region to the unmanned aircraft, based on the position of the unmanned aircraft and the flight-restricted region that have been detected.

5. The flight control device according to claim 1, wherein
the unmanned aircraft includes a sensor whose output signal changes in characteristics in accordance with an object present therebelow,
the region detection unit detects the flight-restricted region by detecting an object present on or at a peripheral portion of the flight-restricted region, based on a change in characteristics of the output signal, and
the distance calculation unit calculates the distance from the flight-restricted region to the unmanned aircraft, based on a distance to the detected object.

6. The flight control device according to claim 1, wherein
the unmanned aircraft includes a sensor whose output signal changes in characteristics in accordance with an object present therebelow,
the region detection unit detects an object present on or at a peripheral portion of the flight-restricted region, based on a change in characteristics of the output signal, and detects a position of the unmanned aircraft and the flight-restricted region by checking the detected object against electronic map data in which a position of the object is registered, and
the distance calculation unit calculates the distance from the flight-restricted region to the unmanned aircraft, based on the position of the unmanned aircraft and the flight-restricted region that have been detected.

7. A flight control method for controlling an unmanned aircraft that is either hovering or moving, comprising the steps of:
(a) detecting a flight-restricted region in which flight is restricted;
(b) calculating a distance from the flight-restricted region to the unmanned aircraft;
(c) specifying an altitude and a speed of the unmanned aircraft, and determining that the unmanned aircraft would land in the flight-restricted region in case of a crash, based on the altitude and the speed that have been specified and the calculated distance;
(d) in response to determining that the unmanned aircraft would land in the flight-restricted region in the case of the crash, instructing the unmanned aircraft to take an action so as not to land in the flight-restricted region even in the case of the crash;
(e) in a case where the unmanned aircraft is hovering, the horizontal distance between the boundary of the flight-restricted region and the unmanned aircraft being smaller than a preset distance threshold, the unmanned aircraft is to take an action land in the flight-restricted region since the landing distance overlaps the flight-restricted region; and
(f) in a case where the unmanned aircraft is moving, the unmanned aircraft is to take an action land in the flight-restricted region since the landing distance overlaps the flight-restricted region, using the horizontal distance, the distance threshold, and the horizontal movement distance that moves in the horizontal direction before the unmanned aircraft crashes.

8. The flight control method according to claim 7, wherein
the unmanned aircraft includes a GPS receiver that receives a GPS signal from a satellite,
in the step (a), the flight-restricted region is detected based on electronic map data that has been created in advance, and,
in the step (b), the distance from the flight-restricted region to the unmanned aircraft is calculated, based on a position of the unmanned aircraft that is specified by the GPS signal and a position of the detected flight-restricted region.

9. The flight control method according to claim 7, wherein
the unmanned aircraft includes a camera that outputs a pixel signal in accordance with received light,
in the step (a), a marker disposed at an outer edge of the flight-restricted region is detected, based on image data that has been generated from the pixel signal, and detects the flight-restricted region, based on the detected marker, and,
in the step (b), the distance from the flight-restricted region to the unmanned aircraft is calculated, from a size and a position of the marker in the image data.

10. The flight control method according to claim 7, wherein
the unmanned aircraft includes a camera that outputs a pixel signal in accordance with received light,
in the step (a), a marker disposed at an outer edge of the flight-restricted region is detected, based on image data that has been generated from the pixel signal, and a position of the unmanned aircraft and the flight-restricted region is detected by checking the detected marker against electronic map data in which a position of the marker is registered, and,
in the step (b), the distance from the flight-restricted region to the unmanned aircraft is calculated, based on the position of the unmanned aircraft and the flight-restricted region that have been detected.

11. The flight control method according to claim 7, wherein
the unmanned aircraft includes a sensor whose output signal changes in characteristics in accordance with an object present therebelow,
in the step (a), the flight-restricted region by detecting an object present on or at a peripheral portion of the flight-restricted region is detected, based on a change in characteristics of the output signal, and,
in the step (b), the distance from the flight-restricted region to the unmanned aircraft is calculated, based on a distance to the detected object.

12. The flight control method according to claim 7, wherein
the unmanned aircraft includes a sensor whose output signal changes in characteristics in accordance with an object present therebelow,
in the step (a), an object present on or at a peripheral portion of the flight-restricted region is detected, based on a change in characteristics of the output signal, and detects a position of the unmanned aircraft and the flight-restricted region by checking the detected object against electronic map data in which a position of the object is registered, and,
in the step (b), the distance from the flight-restricted region to the unmanned aircraft is calculated, based on the position of the unmanned aircraft and the flight-restricted region that have been detected.

13. A non-transitory computer-readable recording medium having recorded thereon a program for controlling an unmanned aircraft by using a computer, the program comprising instructions to cause the computer to execute the steps of:
(a) detecting a flight-restricted region in which flight is restricted;
(b) calculating a distance from the flight-restricted region to the unmanned aircraft;
(c) specifying an altitude and a speed of the unmanned aircraft, and determining whether the unmanned aircraft lands in the flight-restricted region in case of a crash, based on the altitude and the speed that have been specified and the calculated distance;
(d) in the step (c), instructing, if it is determined that the unmanned aircraft would land in the flight-restricted region in a crash, the unmanned aircraft to take an action so as not to land in the flight-restricted region even if the unmanned aircraft crashes;
(e) in a case where the unmanned aircraft is hovering, when the horizontal distance between the boundary of the flight-restricted region and the unmanned aircraft is smaller than a preset distance threshold, the unmanned aircraft is to take an action land in the flight-restricted region since the landing distance overlaps the flight-restricted region; and
(f) in a case where the unmanned aircraft is moving, the unmanned aircraft is to take an action land in the flight-restricted region since the landing distance overlaps the flight-restricted region, using the horizontal distance, the distance threshold, and the horizontal movement distance that moves in the horizontal direction before the unmanned aircraft crashes.

14. The non-transitory computer-readable recording medium according to claim 13, wherein
the unmanned aircraft includes a GPS receiver that receives a GPS signal from a satellite,
in the step (a), the flight-restricted region is detected from electronic map data that has been created in advance, and,
in the step (b), the distance from the flight-restricted region to the unmanned aircraft is calculated, based on a position of the unmanned aircraft that is specified by the GPS signal and a position of the detected flight-restricted region.

15. The non-transitory computer-readable recording medium according to claim 13, wherein
the unmanned aircraft includes a camera that outputs a pixel signal in accordance with received light,
in the step (a), a marker disposed at an outer edge of the flight-restricted region is detected, based on image data that has been generated from the pixel signal, and detects the flight-restricted region, based on the detected marker, and,
in the step (b), the distance from the flight-restricted region to the unmanned aircraft is calculated, based on a size and a position of the marker in the image data.

16. The non-transitory computer-readable recording medium according to claim 13, wherein
the unmanned aircraft includes a camera that outputs a pixel signal in accordance with received light,
in the step (a), a marker disposed at an outer edge of the flight-restricted region is detected, based on image data that has been generated from the pixel signal, and a position of the unmanned aircraft and the flight-restricted region is detected by checking the detected marker against electronic map data in which a position of the marker is registered, and,
in the step (b), the distance from the flight-restricted region to the unmanned aircraft is calculated, based on the position of the unmanned aircraft and the flight-restricted region that have been detected.

17. The non-transitory computer-readable recording medium according to claim 13, wherein
the unmanned aircraft includes a sensor whose output signal changes in characteristics in accordance with an object present therebelow,
in the step (a), the flight-restricted region by detecting an object present on or at a peripheral portion of the flight-restricted region is detected, based on a change in characteristics of the output signal, and,
in the step (b), the distance from the flight-restricted region to the unmanned aircraft is calculated, based on a distance to the detected object.

18. The non-transitory computer-readable recording medium according to claim 13, wherein
the unmanned aircraft includes a sensor whose output signal changes in characteristics in accordance with an object present therebelow,
in the step (a), an object present on or at a peripheral portion of the flight-restricted region is detected, based on a change in characteristics of the output signal, and detects a position of the unmanned aircraft and the flight-restricted region by checking the detected object against electronic map data in which a position of the object is registered, and,
in the step (b), the distance from the flight-restricted region to the unmanned aircraft is calculated, based on the position of the unmanned aircraft and the flight-restricted region that have been detected.

* * * * *